United States Patent [19]

Pines et al.

[11] Patent Number: 5,729,524
[45] Date of Patent: Mar. 17, 1998

[54] OPTICAL DISC CHANGER ASSEMBLY

[75] Inventors: Andrew J. Pines, Highland Park; Edward E. Pellegrini, Palatine, both of Ill.

[73] Assignee: P & P Marketing, Inc., Chicago, Ill.

[21] Appl. No.: 650,742

[22] Filed: May 20, 1996

Related U.S. Application Data

[62] Division of Ser. No. 281,515, Jul. 28, 1994, Pat. No. 5,586,094.

[51] Int. Cl.$^6$ .......................... G11B 17/04; G11B 17/22
[52] U.S. Cl. ................................ 369/178; 369/192
[58] Field of Search .......................... 369/36–38, 178, 369/192; 360/92, 98.05; 294/137, 167–169

[56] References Cited

U.S. PATENT DOCUMENTS

| | | | |
|---|---|---|---|
| 2,946,594 | 7/1960 | Staar | 369/192 |
| 3,085,805 | 4/1963 | Bodenroder | |
| 3,165,321 | 1/1965 | Osborne et al. | 369/192 |
| 4,355,340 | 10/1982 | Butz | 360/133 |
| 4,499,510 | 2/1985 | Harding et al. | 360/77 |
| 4,580,254 | 4/1986 | Hojyo et al. | 369/36 |
| 4,695,990 | 9/1987 | Kawakami | 369/38 |
| 5,031,164 | 7/1991 | Rockola et al. | 369/37 |
| 5,067,116 | 11/1991 | Kadrmas | 369/37 |
| 5,187,695 | 2/1993 | Schindler et al. | 369/37 |
| 5,235,579 | 8/1993 | Ross | 369/178 |
| 5,282,183 | 1/1994 | Arifuku et al. | 369/36 |
| 5,307,331 | 4/1994 | d'Alayer de Costemore d'Arc | 369/37 |

FOREIGN PATENT DOCUMENTS

| | | |
|---|---|---|
| 0 316 953 A2 | 5/1989 | European Pat. Off. |
| 2-44388 | 11/1990 | Japan |

OTHER PUBLICATIONS

NSM of Bingen am Rhein, Germany, NSM Service Manual, pp. 809 and 810.
Rowe International, Inc. of Whippany, N.J.; Rowe R-85 Service Manual, Mechanism Assembly Sheets 1 & 3, Figures 12.
Rowe International, Inc. of Whippany, N.J., Rowe CD-100 Service Manual, Mechanism Assembly Sheets 1 & 2, Figures 8-19.

Primary Examiner—Stuart S. Levy
Assistant Examiner—George J. Letscher
Attorney, Agent, or Firm—Gerstman, Ellis & McMillin, Ltd.

[57] ABSTRACT

An optical disc changer having an optical disc player and a magazine for holding discs is provided. A disc transporter for transporting discs has a carrier to carry a particular disc from the magazine to the disc player for play, and return the disc to its original position after the disc has been played. The disc is seated in the carrier by gravity and makes contact with the carrier only at its rim.

9 Claims, 9 Drawing Sheets

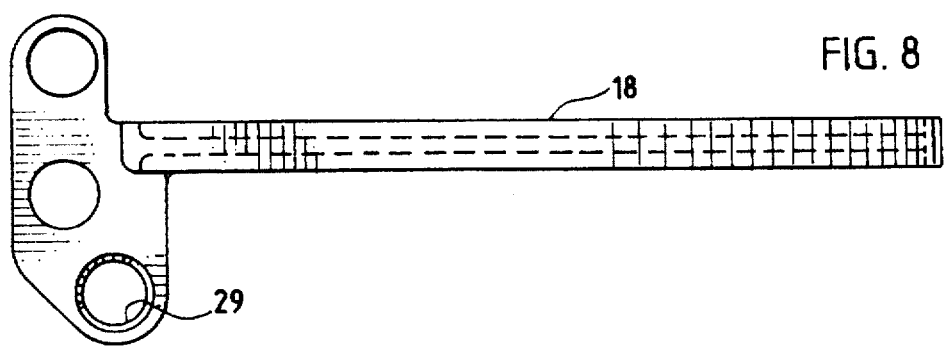
FIG. 8
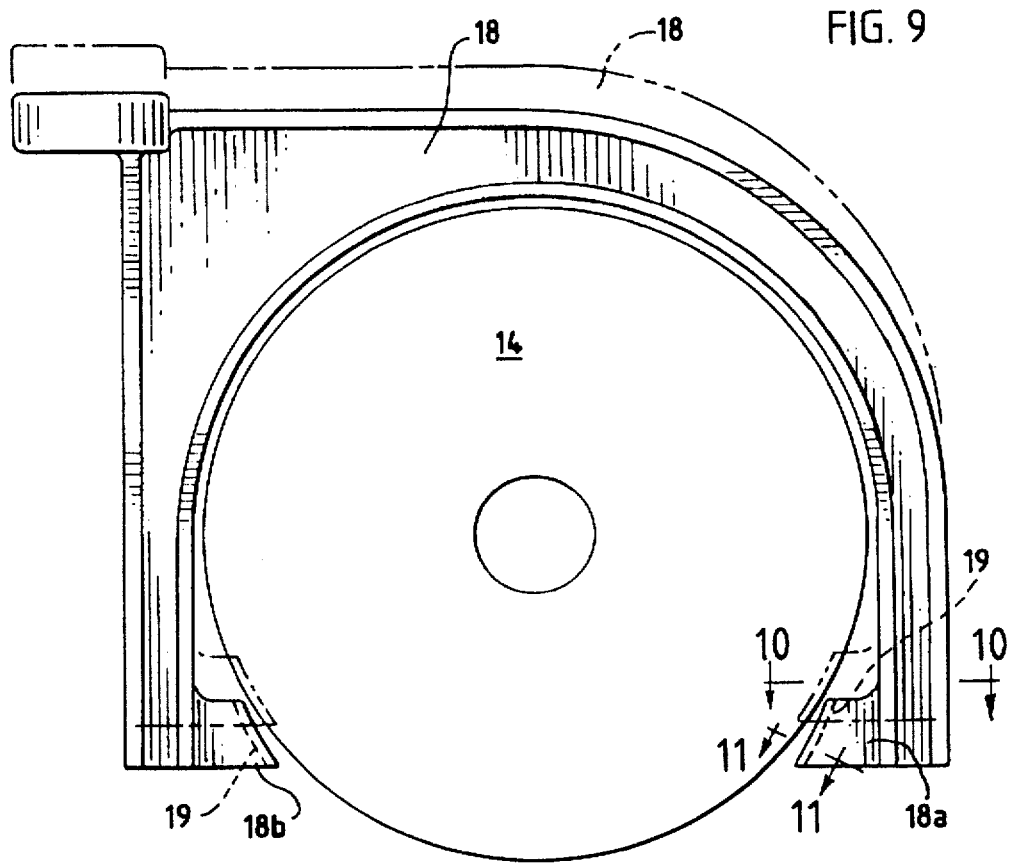
FIG. 9
FIG. 10
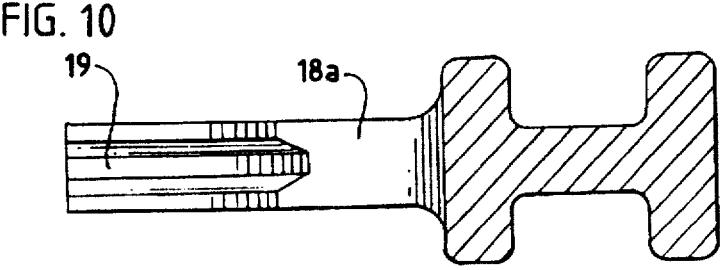
FIG. 11
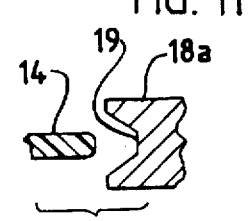

OPTICAL DISC CHANGER ASSEMBLY

This application is a division of U.S. application Ser. No. 08/281,515, filed Jul. 28, 1994, now U.S. Pat. No. 5,586,094 issued Dec. 17, 1996.

FIELD OF THE INVENTION

The present invention concerns a novel optical disc changer assembly.

BACKGROUND OF THE INVENTION

As a result of optical discs being an ideal medium for long term and accurate storage and reproduction of sounds, images and data, they have become extremely popular. However, due to this popularity, large collections of optical discs are being assembled, by offices, individuals and libraries, without adequate means of storage, retrieval and play being available.

One area where multiple disc storage and play has taken root is in audio CDs. A plethora of consumer multi-disc players have been developed and sold. Further, some jukebox companies have developed CD playing jukeboxes changer systems.

In some of these CD jukeboxes, such as the changers of Rowe International, Inc. of Whippany, N.J., Rock-ola Manufacturing Corporation of Torrence, Calif. and Sony Corporation of Tokyo, Japan, a changer mechanism is provided comprising an articulating member used to either grasp or squeeze the CD and move it to the CD player. The articulating member, of some of these jukeboxes, grasps the CD as a person would by placing a finger on either side of the CD and squeezing the CD between the fingers until enough friction to lift the CD, without the CD falling, is generated. NSM of Bingen am Rhein, Germany uses a magazine filled with CD's in trays. The CD's in the NSM system are held horizontally.

The CD changers, with articulating CD graspers, are complicated and delicate pieces of equipment. Such changers may require numerous delicate moving parts and periodic adjustments. Grasping devices, as described, when out of alignment or in disrepair, may immediately cause damage to CDs grasped incorrectly. Further, in order to allow some of these articulating members to grasp a CD it is the rack holding the CD that must be moved to the articulating member. Therefore, special CD holding racks must be provided that allow the rack to rotate to allow each CD to be grasped by the articulating member. Because such holding racks are generally impractical for transporting CDs to and from a jukebox, as such racks are generally large and require special mechanical connection to allow them to move, a technician may have to periodically go to the site of each player in order to provide it with new music and program the new music selection codes into the device. Technicians may have to replace CDs one at a time at the site of these jukeboxes.

Further, specialized racks may be complex mechanisms that could require special manufacturing processes and continuing maintenance in order to work. Also, these racks, because of the amount of space needed for their rotation may be unable to hold large numbers of CDs limiting the play selections the jukebox can provide.

We have found it desirable to have an optical disc changer system, such as a CD changer assembly for use in jukeboxes, that does not grasp the discs on their play faces to move them and therefore causes no playface damage to discs. It is desirable for the device to lift discs as recommended by the manufacturers of discs, that is by the edges. Also, it would be desirable for a disc changer assembly transfer arm to have no moving parts and be easy to manufacture and maintain.

Further, we have found it desirable for a disc changer assembly to have a magazine that can hold many discs in close proximity to each other. This magazine can be molded from plastic and holds discs upright. It would be desirable when updating the disc selections in the changer assembly, for a mew tray with discs in their correct positions to be brought to the site of the changer assembly and simply exchanged for the magazine previously loaded in the changer assembly. It is also desirable for a device using such an assembly in public, such as a jukebox, to be provided with a window that allows users of the device to watch the workings of the device.

It is further desirable to have an optical disc changer assembly that is adaptable, by merely changing the size of certain parts, to all types of optical discs, not just CDs.

It is therefore an object of the present invention to provide a disc changer assembly that is easy to use, inexpensive to manufacture and maintain and provides space for a large number of discs.

It is a further object of the present invention to provide a disc changer assembly that provides highly accurate selection of discs with minimum movement of a transport carriage and no movement in the magazine.

It is a further object of the present invention to provide a disc changer assembly that is entertaining to watch.

It is a further object of the present invention to provide a disc changer assembly design that is adaptable to all types of optical discs.

Other objects and advantages of the present invention will become apparent as the description proceeds.

SUMMARY OF THE INVENTION

In accordance with the present invention, an optical disc changer comprising a disc player and a magazine for holding discs in a non-horizontal position is provided. A transporter of optical discs comprising a carrier is provided, to carry a particular disc from the magazine to the disc player for play, and to return the disc to its original position after the disc has been played. The disc is transported such that it is seated in the carrier by gravity and makes contact with the transfer arm only at the disc's rim.

In the illustrative embodiment of the present invention, the transporter comprises a transfer arm that is a one piece molded part for lifting compact discs by their rims. This design may, however, be applied to all types of optical discs without departing from the scope of the present invention.

A magazine for holding a plurality of compact discs is also provided in the illustrative embodiment of the present invention. This design may also be applied to all types of optical discs without departing from the scope of the present invention. The magazine is designed to hold discs by their rim, as recommended by their manufacturers, and the discs are seated in the magazine by gravity. The discs are held close together providing space for a large number of discs.

It should be noted that the word "play" as used throughout the specification and claims here is to be interpreted to include any manner in which data, sound, video or information is gathered from an optical disc including, for example, "read" as in CD—Read Only Memory (ROM).

A more detailed explanation of the invention is provided in the following description and claims and is illustrated in the accompanying drawings.

BRIEF DESCRIPTION OF THE DRAWINGS

FIG. 8 is a planar view of a transfer arm in accordance with the present invention.

FIG. 9 is an elevational view of a transfer arm in accordance with the present invention.

FIG. 10 is a cross-sectional view, taken along the plane of line 10—10 of FIG. 9 of a transfer arm in accordance with the present invention.

FIG. 11 is a cross-sectional view, taken along the plane of line 11—11 of FIG. 9 of a transfer arm in accordance with the present invention.

DETAILED DESCRIPTION OF THE ILLUSTRATIVE EMBODIMENTS

Figure 1:
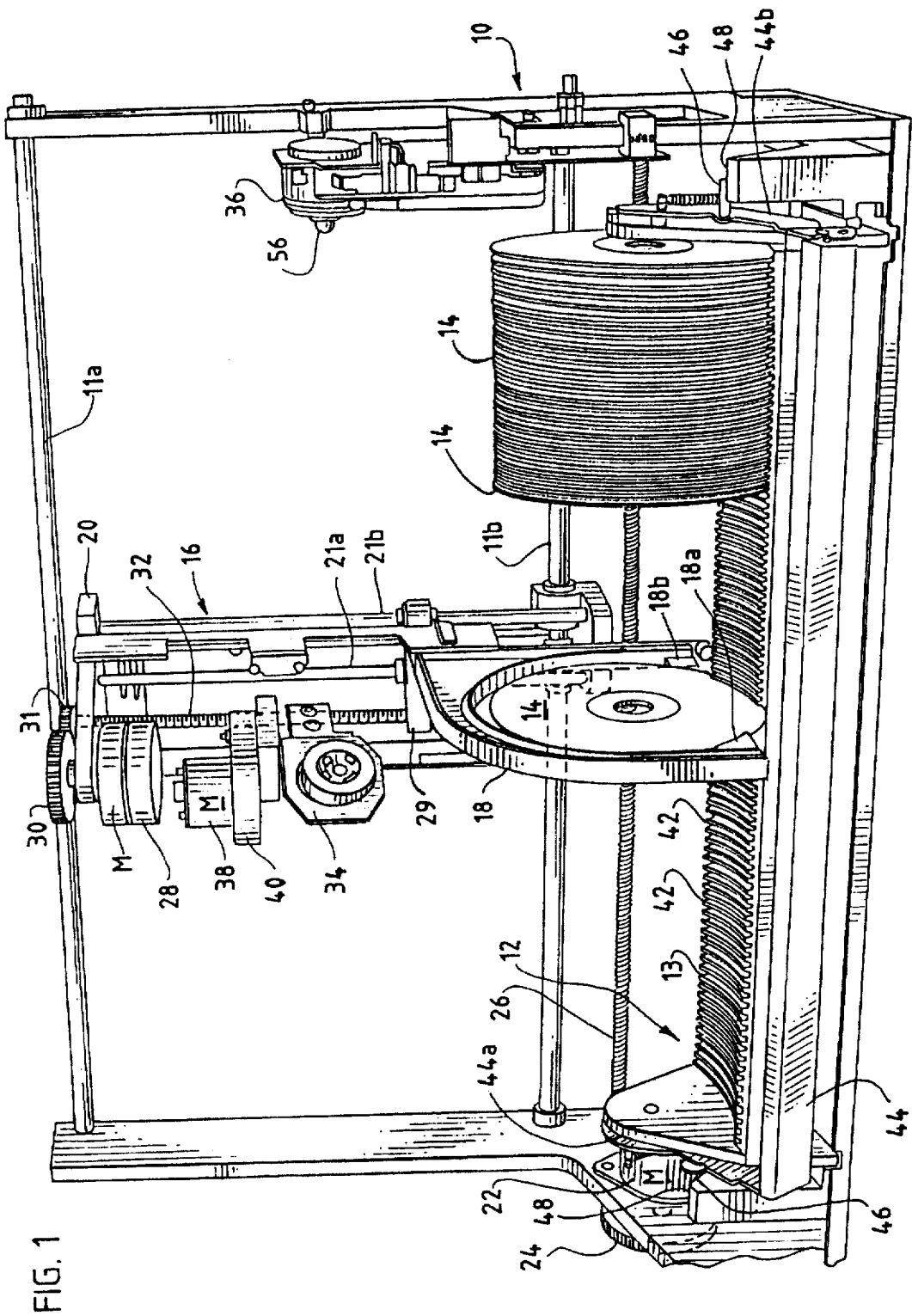
FIG. 1 is a perspective view of a assembly in accordance with the present invention showing the transfer mechanism of the device in a lowered position.

Referring to the figures, FIGS. 1–4 show various steps in taking an optical disc 14 from storage to play. These steps will be explained in detail below. Although the illustrative embodiments describe the use of a compact disc or CD, it is to be understood that any type of optically readable disc may be substituted therefor.

FIGS. 1–4 show a compact disc changer assembly 10 having a magazine 12 for holding a plurality of compact discs 14. The changer assembly 10 has a transport system 16 comprising a transfer arm 18 having generally a horseshoe shape, with a left inward projection 18a and a right inward projection 18b on which CDs 14 are seated by gravity. In the illustrative embodiment transfer arm 18 is molded of plastic but it may be cast or otherwise formed of a number of materials including, for example, aluminum.

Projections 18a and 18b each define a groove 19 (FIGS. 9–11) on which CD 14 is seated. Grooves 19 sweep out an arc of the same radius as CD 14 and are situated such that CD 14 rests on both grooves 19 when a CD 14 is being carried by transfer arm 18. Grooves 19 are designed to seat CD 14 by gravity and therefore are cut slightly wider than the rim of a CD 14 at the top of groove 19 and taper down so that they are slightly thinner than the thickness of the rim of CD 14 at the bottom of the groove.

Figure 12:
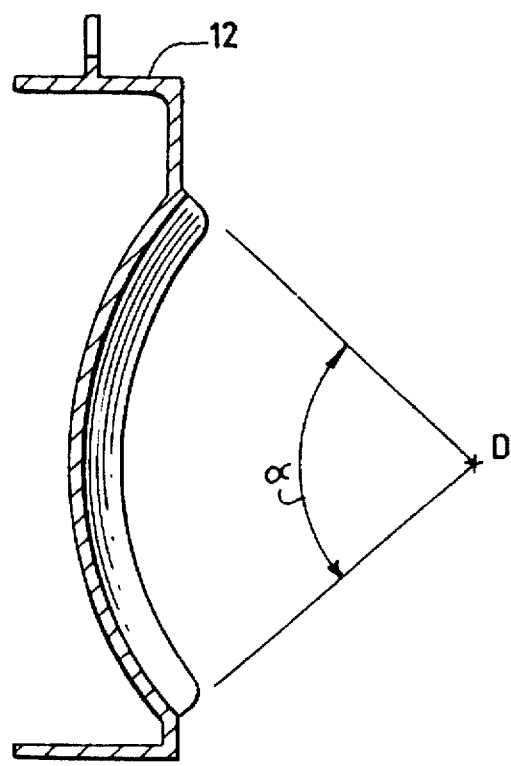
FIG. 12 is a cross-sectional view, taken along the plane of line 12—12 of FIG. 6 of a disc holding magazine in accordance with the present invention.
Figure 13:
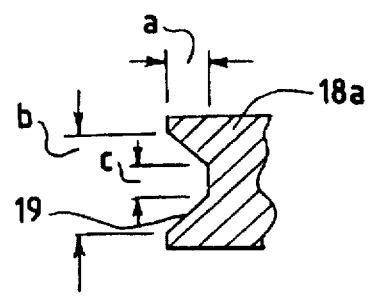
FIG. 13 is a similar cross-sectional view as that of FIG. 11.
Figure 14:
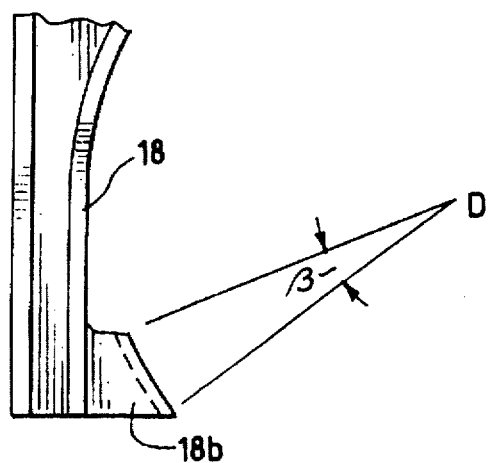
FIG. 14 is a partial elevational view of a leg of a transfer arm in accordance with the present invention.

The standard minimum rim thickness for CD's is 1.1 mm, or 0.0433 inches. The preferred lateral size, i.e. cross-sectional thickness, for grooves 19, as shown in FIG. 13 is 0.1 inches at the top of groove 19 (FIG. 13, dimension b) and tapers down to 0.040 inches at the bottom of groove 19 (FIG. 13, dimension c). The taper described takes place over a preferred depth of 0.062 inches (FIG. 13, dimension a). It is to be understood that a range of sizes 0.08 to 0.12 inches at the top of groove 19 and 0.34 and 0.433 inches at the bottom of groove 19 can be defined without departing from the novel scope of the present invention. Clearly, a bottom groove thickness of greater than the CD 14 rim thickness will cause CD 14 to tip and fall from groove 19. Magazine 12 defines similar groove thicknesses for magazine grooves 42 (FIG. 1). The preferred longitudinal size, i.e. length, for grooves 12, of transfer arm 18, is in the range of 5° to 15° of the circumference of CD 14, but preferably 10° of the circumference (FIG. 14, angle β). The preferred longitudinal size, i.e. length, for grooves 42, of magazine 12, is in the range of 70° to 100° of the circumference of CD 14, but preferably 87° of the circumference (FIG. 12, angle α). In FIGS. 12 and 14, "D" represents the center of CD 14. It is to be understood that these dimensions can be changed to accommodate different types of optical discs without departing from the novel scope of the present invention.

Transfer arm 18 is attached to carriage 20 which provides forward and reverse movement of transfer arm 18 along the longitudinal axis of magazine 12 as well as up and down movement of transfer arm 18. Changer assembly 10 has rods 11a and 11b for structural stability of changer assembly 10 and to allow for the steady movements of carriage 20 which rides on rods 11a and 11b. Carriage 20 also has rods 21a and 21b for structural stability and to allow for the steady up and down movements of transfer arm 18 which rides on rods 21a and 21b.

Figure 6:
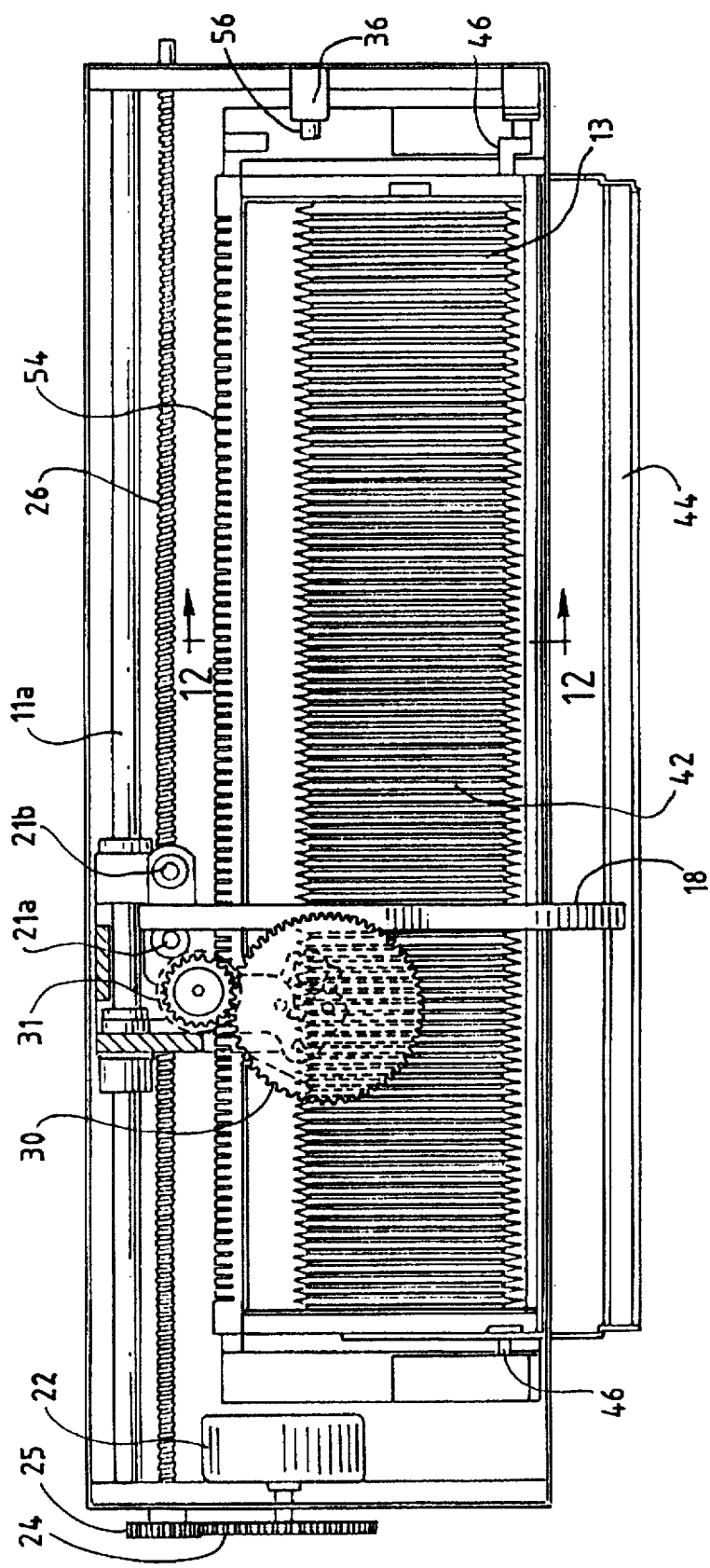
FIG. 6 is a planar view of a disc holding magazine in accordance with the present invention in place in the device of the present invention.

FIG. 1 shows transfer arm 18 in the down position at which the device may retrieve CD 14 or deposit CD 14. Changer assembly 10 includes motor 22, gear 24 and horizontal lead screw 26 keyed to gear 25 (FIG. 6), which together, in combination with inner threaded gear or "power nut" 27 (FIG. 2) on carriage 20, allow carriage 20 to move forward or backward along the longitudinal axis of magazine 12, on rods 11a and 11b. Carriage 20 also includes a motor 28, gear 30 and vertical lead screw 32, keyed to gear 31 (FIG. 1), which together, in combination with inner threaded gear or "power nut" 29 on carriage 20, allow transfer arm 18 to rise or descend along carriage 20, on rods 21a and 21b. Carriage 20 further comprises a clamp 34 for holding CD 14 to CD player 36 and a motor 38 and gearbox 40 which together allow clamp 34 to open and close on CD 14.

Figure 5:
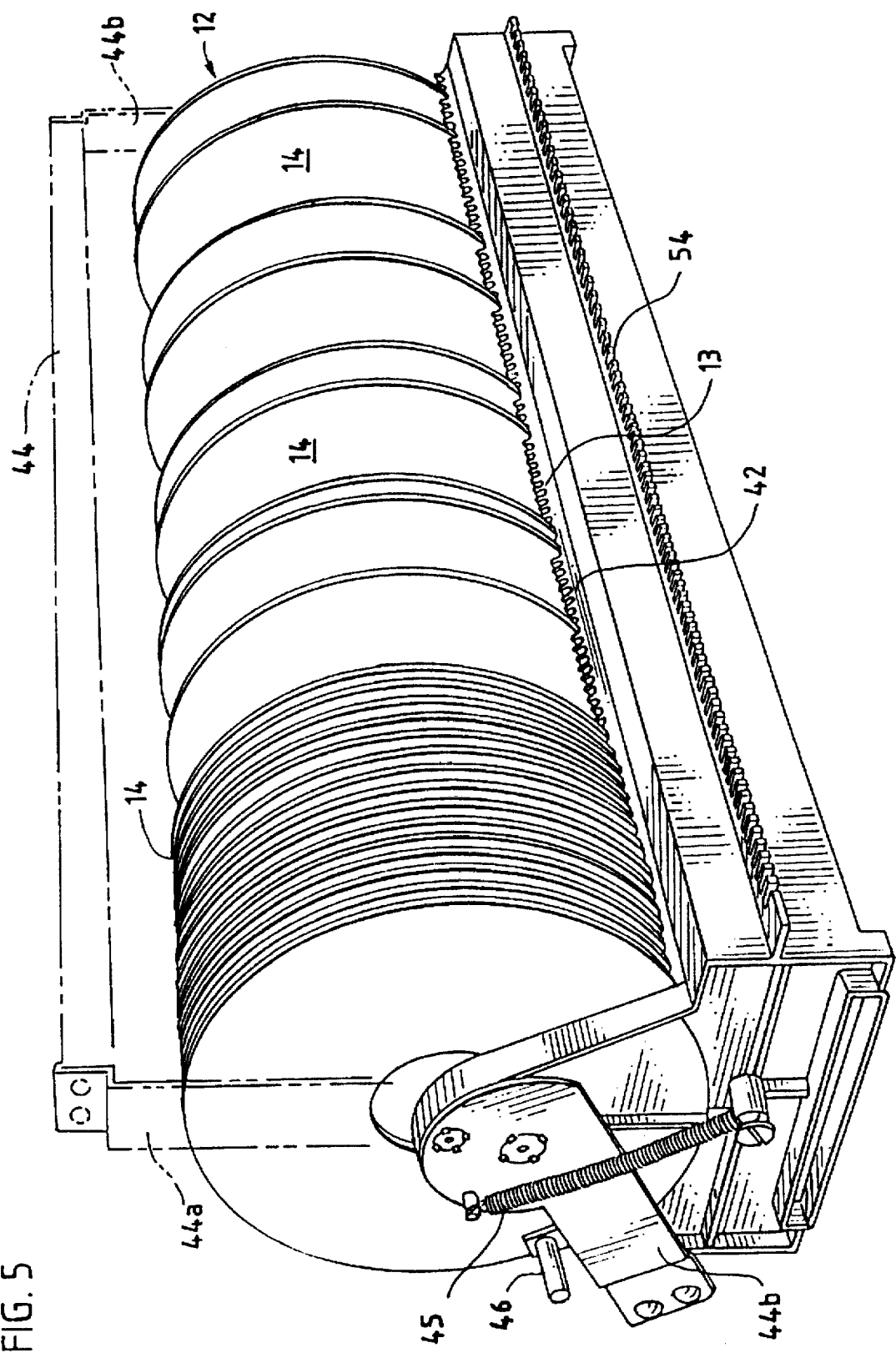
FIG. 5 is a perspective view of a disc holding magazine in accordance with the present invention.
Figure 7:
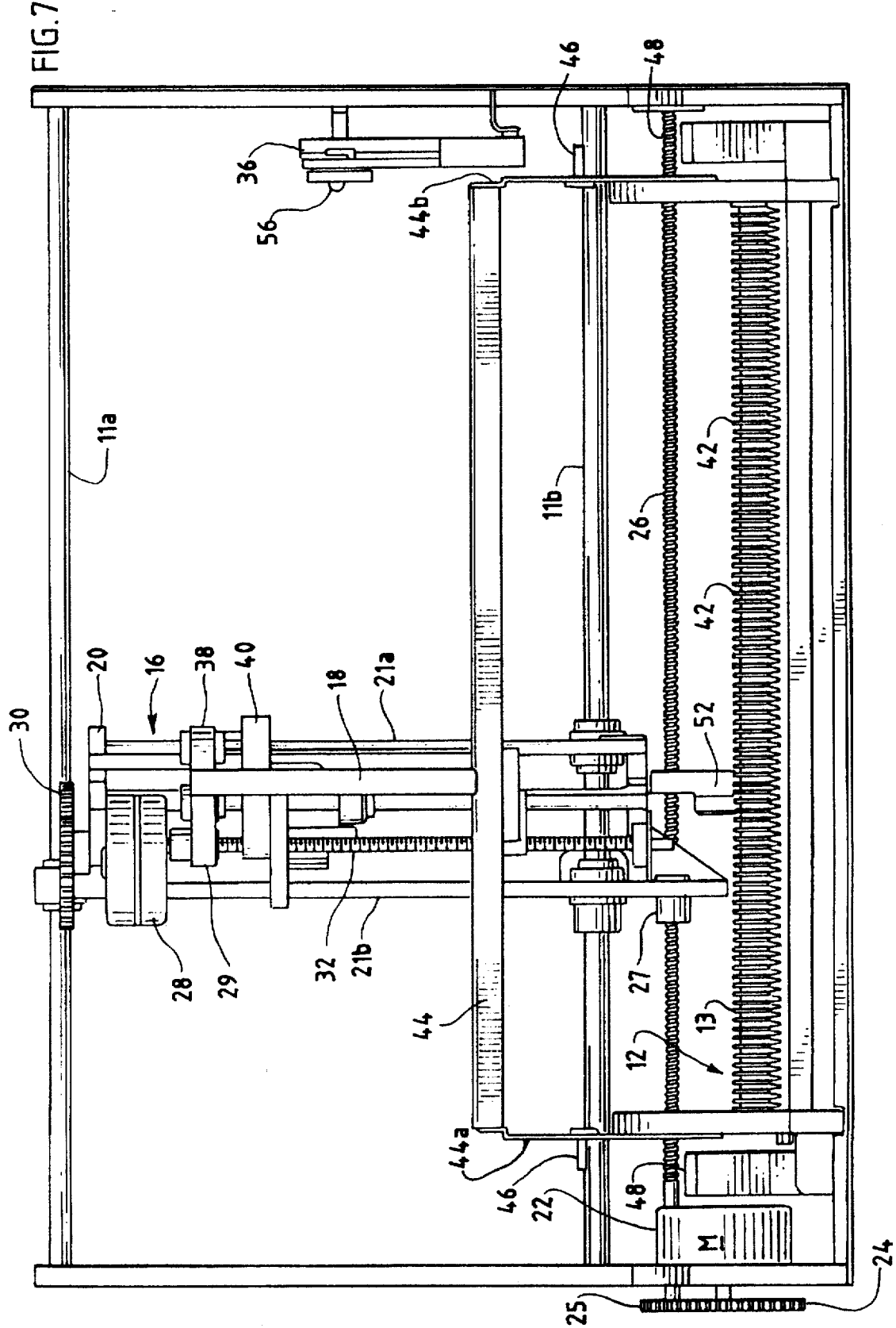
FIG. 7 is an elevational view of a device in accordance with the present invention.

Magazine 12 comprises a tray 13, preferably molded of plastic, having a plurality of grooves 42, each having a V-shaped cross-section, defining an arc having the same sweep and radius as the arc of CD 14. Magazine grooves 42 are of a size and shape similar to grooves 19 discussed above. Magazine grooves 42 are defined such that CD 14 rests within a magazine groove 42 held only by gravity and friction. Magazine 12 further comprises a rotatable handle 44, having aligning pins 46 along legs 44a and 44b. Magazine 12 may be lifted and carried, without dropping CDs 14 carried therein, when handle 44 is in its upright position (FIG. 5 dashed lines, and FIG. 7). Handle 44 helps to maintain magazine 12 in its proper position when magazine 12 is placed in changer assembly 10 and handle 44 is lowered (FIG. 1). When magazine 12 is placed in changer assembly 10 and handle 44 is lowered, alignment pins 46 contact inclined planes 48 on changer assembly 10 causing magazine 12 to move forward into position. This alignment is necessary to insure that the correct CD 14 is retrieved when a user has made a selection. Tension spring 45 (FIG. 5) helps keep handle 44 in its lowered position, thereby keeping alignment pins 46 in contact with inclined planes 48.

In the operation of the changer assembly 10, a number of CDs 14 are placed in predetermined locations on magazine 12. These locations are then programmed into a microcomputer (not shown) and the location and title are made aware to the user of the jukebox either through a written or electronic menu on the jukebox. When a selection has been made, the microcomputer signals motor 22 to operate, turning gears 24 and 25 which causes horizontal lead screw gear 26 to move carriage 20, by means of power nut 27, towards the correct CD 14. The correct CD 14 is determined by the location numbers or letters, or combinations thereof, which the user has entered through a keypad, or other data entry device.

An opto-coupler 52 (FIG. 2) is provided to count the CD location, by means of notches 54 (FIGS. 5, 6) on magazine 12, and choose the position of selected CD 14. Opto-coupler 52, which comprises a light source such as an infrared beam, counts the number of notches it passes as carriage 20 travels along magazine 12. Further, a step counter (not shown), comprising software within the microcomputer that counts the steps made by carriage 20, is also provided to determine the position of carriage 20 from the end of magazine 12, so as to back up the opto-coupler 52 in finding selected CD 14. Initially, a base or zero location is entered into the memory location of the microcomputer. This step may occur during the daily start up procedure of the jukebox. Subsequently, by using opto-coupler 52 the step-counter, the microcomputer is continually updated as to the location of carriage 20. When a selection is made, the coordinates or numeric location of the selection is entered into the microcomputer which compares the location to its present location and signals motor 22 to move carriage 20 to the location of the selection. In this way, the correct CD 14 is chosen.

Figure 2:
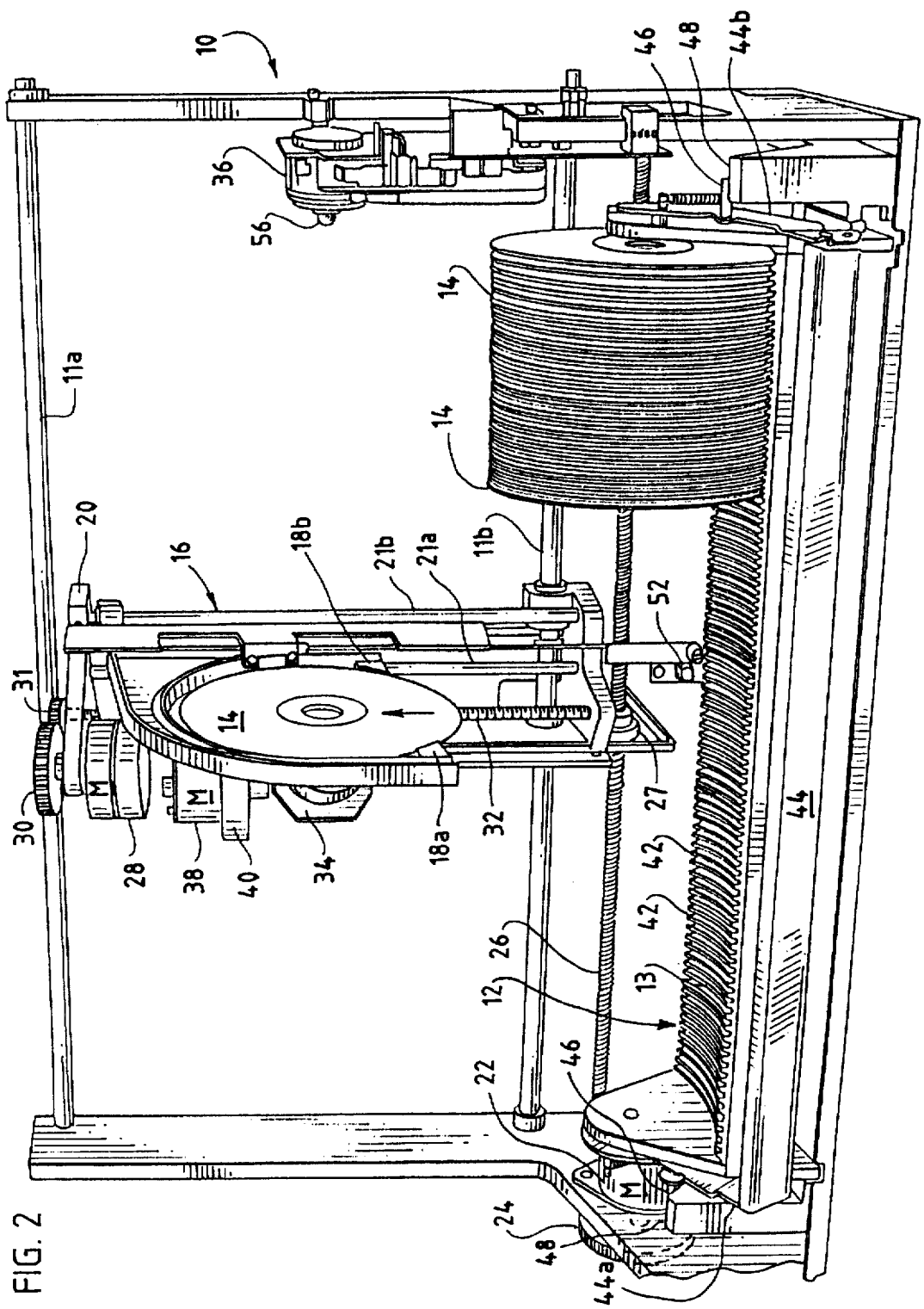
FIG. 2 is a perspective view of a disc changer assembly in accordance with the present invention showing the transport mechanism of the device in a raised position.
Figure 3:
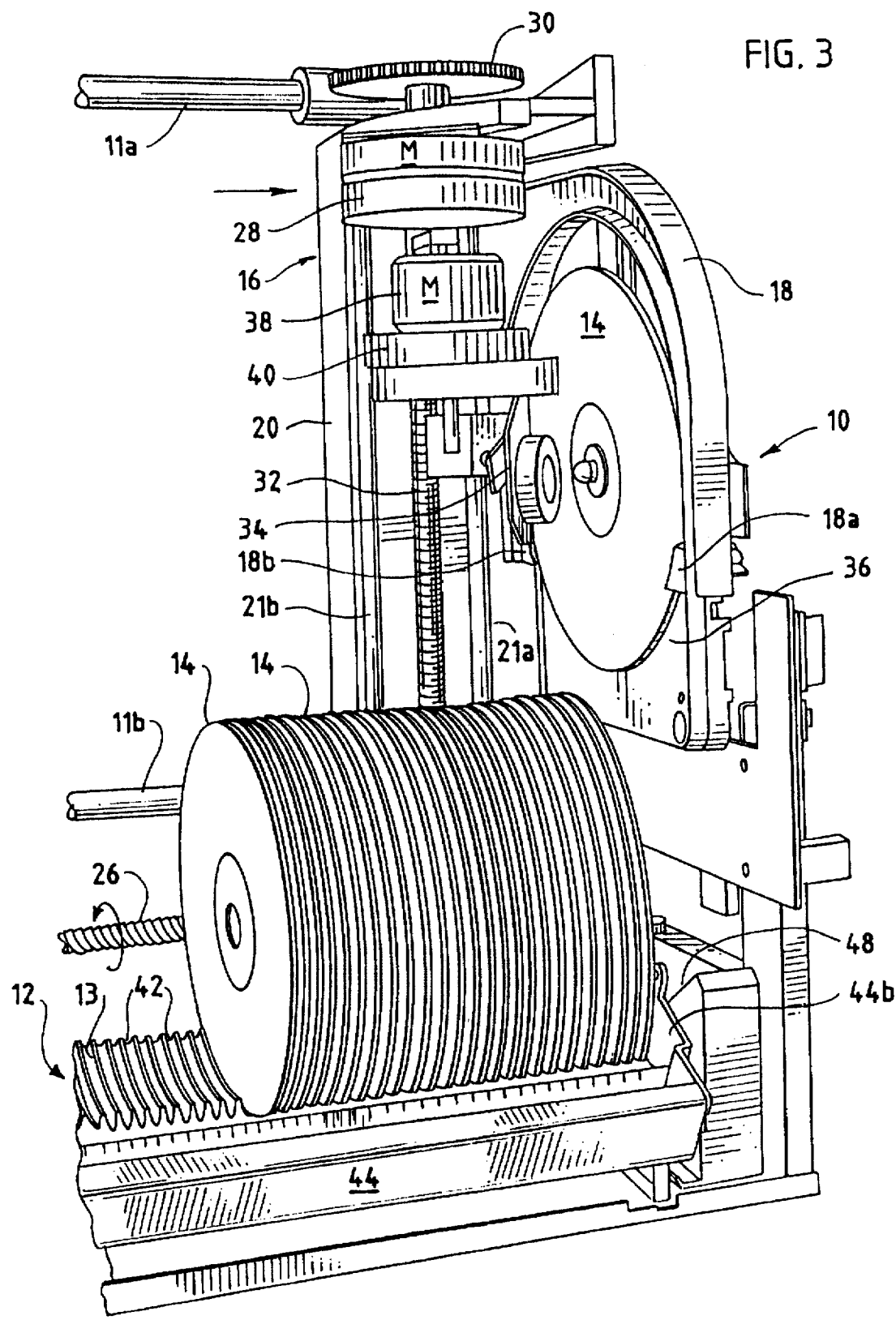
FIG. 3 is a perspective view, partially broken of the disc changer of FIG. 2 showing the transport mechanism at the disc player.
Figure 4:
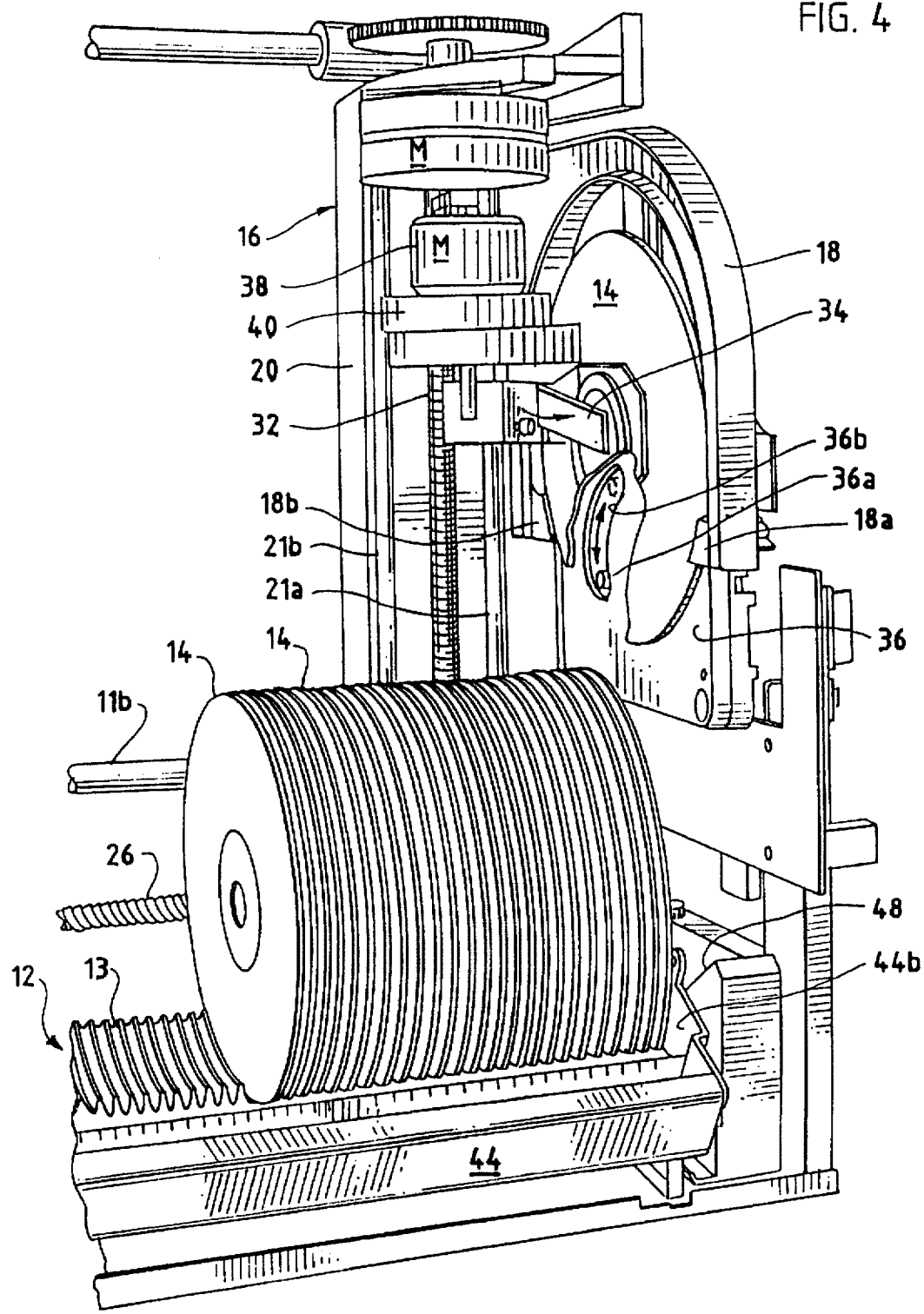
FIG. 4 is a perspective view, partially broken of a disc changer in accordance with the present invention, showing the transport mechanism at the disc player and the disc ready to play.

Transfer arm 18 is lowered onto magazine 12, below the lowest level of CDs 14, by motor 28 and gears 30, 31, 32 and power nut 29. Transfer arm 18 may ride along the longitudinal axis of magazine 12 either in the raised position, above CDs 14, or along magazine 12 at a point such that inward projections 18a and 18b are below the lowest level of CDs 14 on magazine 12. The internal diameter of transfer arm 18 above projections 18a and 18b, is larger than the diameter of CD 14. In this manner, transfer arm 18 may approach the selected CD 14 without projections 18a and 18b running into any other CD. As shown in FIGS. 1 and 2, upon finding the chosen CD 14, transfer arm 18 rises and grooves 19, defined in inward projections 18a and 18b, contact CD 14 along its rim and raise the CD 14 (FIG. 1). In this way, CD 14 in transfer arm 18 can proceed towards CD player 36 over the remaining CDs in magazine 12. Carriage 20 is then moved forward to player 36, as shown in FIG. 3. Upon reaching player 36, CD 14 is placed upon spindle 56 and clamp 34 is closed, by motor 38 and gearbox 40, as shown in FIG. 4. FIG. 4 further shows, through a partially broken away CD 14, the slot 36a through which the laser 36b of the CD player 36 moves to access the entire play surface of CD 14.

To begin playing CD 14, clamp 34 is closed onto spindle 56, by motor 38 and gearbox 40. Transfer arm 18 is then caused to lower fractionally to release CD 14 from grooves 19 onto spindle 56 of compact disc player 36. CD 14 is held in place by clamp 34 throughout play. When the selection has finished, transfer arm 18 rises to engage compact disc 14 on grooves 19, in a reverse process to that explained above, and clamp 34 is opened. Transfer arm 18 is then caused to reverse course and return the compact disc to its original location.

Throughout this process both opto-coupler 52, notches 54 and the step counter are used to determine the exact position of the transfer arm 18, in relation to the number of spaces from the end of magazine 12. In this way, the next selection may be retrieved without the transfer arm 18 having to be returned to a base position.

In another embodiment of the present invention, clamp 34 is connected to the same motor 28 and gears (30, 31 and 32) as transfer arm 18 and the movement necessary to close clamp 34 onto spindle 56 causes transfer arm 18 to lower and thereby release CD 14 onto spindle 56. The subsequent raising of transfer arm 18 to retrieve CD 14 causes the opening of clamp 34 beginning the return of CD 14 to magazine 12.

In the preferred embodiment, the device of the present invention is located inside a jukebox which is provided with a means to display the device through at least one of the walls of the jukebox. In this way, users of the device are also entertained by the workings of the device.

In one embodiment, the device of the present invention may be used in combination with an external computer and compact disc read only memory (CD-ROM) device providing an entire library of computer programs and information in a convenient and easy to access manner.

In one embodiment, the device of the present invention may be used in combination with one or more external television, monitor or other video device to provide an entire library of film or other video entertainment (including photo discs) in a convenient and easy to access manner.

Although an illustrative embodiment of the invention has been shown and described, and other embodiments have been described, it is to be understood that various modifications and substitutions may be made by those skilled in the art without departing from the novel spirit and scope of the invention.

What is claimed is:

1. An optical disc changer comprising:

an optical disc player;

a magazine for holding discs in a substantially vertical position;

a disc transporter for moving an optical disc from said magazine to said optical disc player for play, and for returning said disc to said magazine after said disc has been played;

said magazine comprising a tray having a plurality of grooves, each of said grooves having a generally v-shaped cross-section, said grooves defining an arc having substantially the same radius as the radius of the optical disc;

said grooves being positioned to underlie the disk on both sides of an imaginary vertical line extending through the center of the disc substantially below and not above an imaginary horizontal line extending through the center of the disc so that the discs are picked up and moved by the disc transporter;

said grooves being defined to enable discs to rest within the grooves and be held only by gravity and friction.

2. An optical disc changer as defined by claim 1, in which said magazine includes a rotatable handle;

said optical disc changer including a changer assembly for holding said magazine;

said handle being constructed to align and couple said magazine to said changer assembly when said handle is in a lowered position and to allow said magazine to be removed from said changer assembly when said handle is moved upward to another position.

3. An optical disc changer as defined by claim 2, in which said rotatable handle includes a pair of opposed legs each carrying an alignment pin; said changer assembly including a pair of inclined planes for receiving said alignment pins whereby when said rotatable handle is in its lowered position said alignment pins contact said inclined planes on said chamber assembly causing the magazine to move forward into a desired position on said changer assembly.

4. An optical disc changer as defined by claim 3, in which said magazine comprises a tension spring to aid in maintaining said rotatable handle in its lowered position.

5. An optical disc changer as defined by claim 1, including a microcomputer having a step counter that detects the movement of said disc transporter with respect to said magazine; an opto-coupler including a light source for detecting the movement of the disc transporter with respect to said magazine; said step counter and opto-coupler cooperating to determine the position of the disc transporter in relation to the magazine.

6. An optical disc changer comprising;

an optical disc player;

a magazine for holding discs in a substantially vertical position;

a disc transporter for moving an optical disc from said magazine to said optical disc player for play, and for returning said disc to said magazine after said disc has been played;

said optical disc changer including a changer assembly for holding said magazine;

said magazine including a rotatable handle;

said handle being constructed to align and couple said magazine to said changer assembly when said handle is in a lowered position and to allow said magazine to be removed from said changer assembly when said handle is moved upward to another position, said handle being constructed so when the handle is in said lowered position the disc transporter is able to access the disc in said magazine.

7. An optical disc changer as defined by claim 6, in which said rotatable handle includes a pair of opposed legs each carrying an alignment pin; said changer assembly including a pair of inclined planes for receiving said alignment pins whereby when said rotatable handle is in its lowered position said alignment pins contact said inclined planes on said chamber assembly causing the magazine to move forward into a desired position on said changer assembly.

8. An optical disc changer as defined by claim 7, in which said magazine comprises a tension spring to aid in maintaining said rotatable handle in its lowered position.

9. An optical disc changer as defined by claim 6, including a microcomputer having a step counter that detects the movement of said disc transporter with respect to said magazine; an opto-coupler including a light source for detecting the movement of the disc transporter with respect to said magazine; said step counter and opto-coupler cooperating to determine the position of the disc transporter in relation to the magazine.

* * * * *